No. 800,516. PATENTED SEPT. 26, 1905.
J. S. A. TOURNIER.
PHOTOSTEREOSCOPIC APPARATUS.
APPLICATION FILED JAN. 22, 1903.

2 SHEETS—SHEET 1.

WITNESSES:
W. M. Avery
C. E. Holske

INVENTOR
Jules Sénèque Auguste Tournier
BY
[signature]
ATTORNEYS:

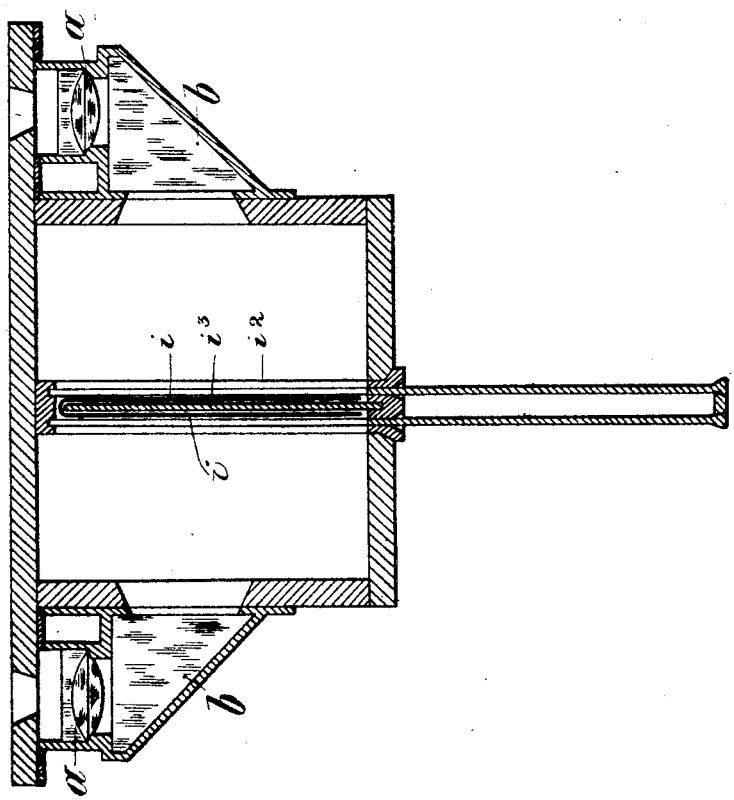

UNITED STATES PATENT OFFICE.

JULES SÉNÈQUE AUGUSTE TOURNIER, OF BOURGES, FRANCE.

PHOTOSTEREOSCOPIC APPARATUS.

No. 800,516.        Specification of Letters Patent.        Patented Sept. 26, 1905.

Application filed January 22, 1903. Serial No. 140,096.

*To all whom it may concern:*

Be it known that I, JULES SÉNÈQUE AUGUSTE TOURNIER, captain of artillery, of Bourges, Cher, Republic of France, have invented Improvements in Photostereoscopic Apparatus, of which the following is a full, clear, and exact description.

In the photostereoscopic appliances ordinarily used two identical objectives are parallelly arranged. They give either upon a single plate of sufficient length or upon two separate parallel plates two images individually inverted and in each the right-hand portions of the photographed object are seen upon the left-hand side and inversely the left-hand portions are seen on the right; besides, the centers of said two images are always at the same distance apart as the centers of the two objectives. The result is whenever it is wished to obtain a stereoscopic base larger than the distance apart of the eyes with small negatives the apparatus presents a large volume on account of the distance or space lost in its center.

The object of the present invention is an especial arrangement for reducing the volume of said apparatus by utilizing the whole space comprised between the two objectives.

Said arrangement essentially consists of adjoining a reflecting-prism to each of the objectives in such a way that the edges of the prisms shall be perpendicular to the optical axes of the objectives and that their emergent faces shall be directed oppositely in order to turn toward the center of the apparatus, the two images being inverted laterally. Said images are received on two sensitive surfaces placed back to back at the center of the apparatus in planes perpendicular to the axes of the luminous rays emerging from each optical system; besides, the faces of incidence and emergence of the prisms are respectively perpendicular to the axes of the incident and emerging luminous rays; besides, the prism may be of any opening and placed before or behind of the objective or between the lenses forming the latter. Said objective may be of any system, provided that its optical axis be in the plane perpendicular to the edges of the prism.

The invention is represented in the adjoining drawings in principle and only as examples.

Figure 3:
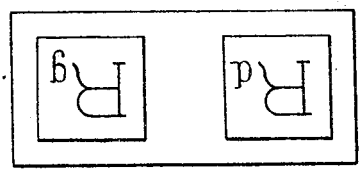
Figure 2:
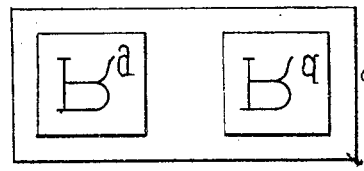
Figure 1:
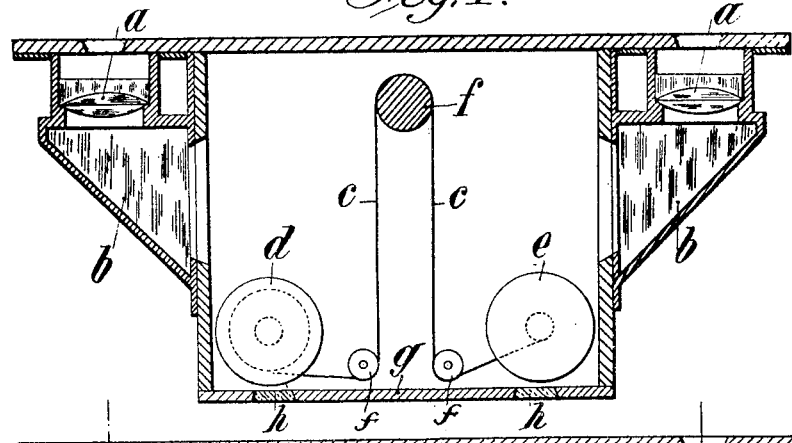

Figure 1 is a sectional view of the improvement. Fig. 2 represents a stereoscopic negative, obtained with the arrangement or apparatus forming the subject of the present invention, seen through the support of the film. Fig. 3 indicates a stereoscopic negative, seen from the same side, obtained with a common or regular apparatus in which the separation of the objectives must be reduced to equal the separation of the two images of said negative; and Figs. 4, 5, 6, and 7 are sectional views of modified forms of the apparatus.

As it is demonstrated by Fig. 1, said arrangement comprises behind the two parallel sterescopic objectives *a* two reflecting rectangular prisms *b*, the emergence faces of which are parallel and are directed oppositely. The object of said two prisms *b* is to send toward the center of the apparatus the two simple images, inverting them individually only in the vertical sense, Fig. 2—that is to say, that through the sensitive surface or ground glass the higher portions of the photographic subject are seen below and inversely the lower portions are seen on top; but the right-hand parts are always seen to the right and the left portions are always seen to the left. The images are received upon a sensitive surface *c*, which is unwound from a magazine-spool *d* onto a receiving-spool *e*. The band of film *c* is guided by three rollers *f* in such a manner as to be presented parallelly to the emergence faces of the two rectangular prisms *b*. The back *g* of the box may be opened in such a manner as to permit of replacing the film *c*. Said back *g* will be provided with two red-glass peep-holes *h*, through which the number of the film can be read. The images received upon the sensitive surface *c*, developed on a plane, are then seen as it is represented in Fig. 2. Their separation from center to center is completely different from that of the objectives, and it can be equal to the separation of the eyes, no matter what the stereoscopic base be adopted, in order to increase the sensation of relief. Said stereoscopic base depends not on the size selected for the negative, but on the focal distance selected for the objectives. It is seen, besides, that in reversing upside down the negative, Fig. 2, and looking at it from the side of the emulsion the exact stereoscopic effect is obtained. The same effect will be produced from the positive obtained by direct copying. If said copy is made by contact of the two sensitive surfaces, which is the ordinary case, the positives should be seen through the back to render faithfully the subject.

In cases of positives on paper it would be necessary for the printing to apply on the paper the back of the stereotype or negative, this being easily done with the film-negatives.

The advantages of said arrangement are as follows:

First. It permits of producing an apparatus of very reduced volume, in which the separation of the optical axes of the objectives may be selected between limits sufficiently spaced. Said separation can be taken larger than the one existing on regular apparatus, so as to render more clearly the stereoscopic effect obtained without producing an increase in the separation of the positive obtained by direct copying.

Second. It permits very readily utilizing sensitive film-bands for stereoscopic photography. Wound up, as it is shown in Fig. 1 the film is successfully displayed in the focal planes of the two optical combinations, a continuous series of double negatives may be obtained in juxtaposition upon the band of film. This latter will give subsequently by direct copying effected in a single operation upon a band of the same length a series of stereoscopic positives adapted for the immediate examination in the stereoscope.

Third. The photostereoscopic apparatus thus obtained is of a reduced weight and volume when compared with magazine appliances as hitherto constructed. It, however, has all the advantages inherent to the employment of films, (facility of daylight recharging, reduction of weight, and of encumbrances as regards the plates, &c.)

Fourth. Owing to the method of direct printing of the positives in one operation precision in the correspondence of the two half-views is absolutely insured, and the film employed may be reduced to the lowest limit, and consequently the volume and the weight of the stereoscopic apparatus, while at the same time preserving for the objectives a separation equal to or exceeding that of the eyes.

Figure 4:
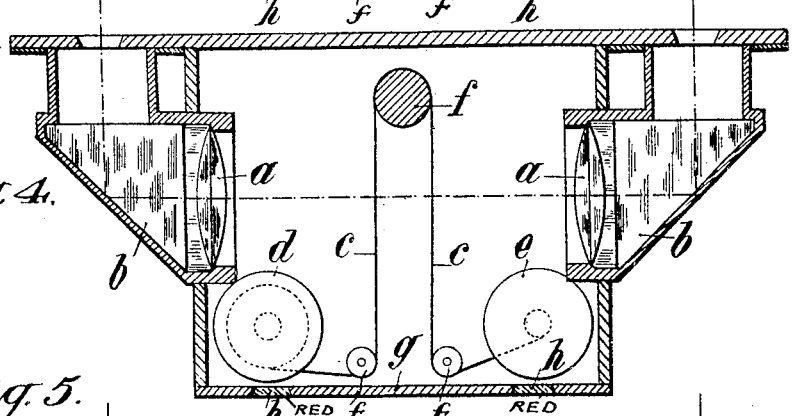
Figure 5:
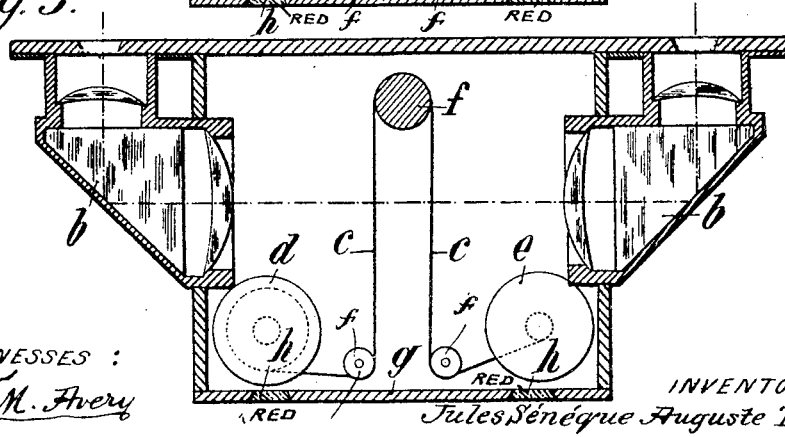

This combination prism-objective can be constructed with objectives of any kind and with prisms of any aperture, and the prisms may be arranged behind the objective, as shown in Fig. 1, or in front of the objective, as shown in Fig. 4, or between the various lenses which compose it, as shown in Fig. 5. In prisms of any aperture whatever the axes of the luminous rays emergent therefrom are inclined to each other at a certain angle, and the planes of the two sensitive surfaces are also inclined in the same way. The described arrangement may be also applied to apparatus employing yielding plates, as shown in Fig. 6, or to apparatus having double-plate holders or slides whose two plates would be simultaneously exposed, as shown in Fig. 7.

As shown in Fig. 6, the yielding plates $i$ are inclosed within a double frame $i^2$, the plates being bent over the partition $i^3$ of the frame, while in Fig. 7 the partition $i^4$ of the double frame $i^5$ entirely separates the rigid plates $i^7$ one from the other.

Having thus described my invention, what I claim, and desire to secure by Letters Patent, is—

1. In a stereoscopic photographic camera, in which the images produced by the objectives are laterally inverted by reflecting-surfaces in order to avoid the cutting of the positives or negatives, the combination with the objectives, of reflecting-prisms, the edges of which prisms are perpendicular to the plane of the optical axes of the objectives and of which the faces of incidence and emergence are respectively perpendicular to the axes of the incident and emergent luminous rays and of which the emergent faces are directed oppositely in order to throw toward the center of the apparatus the two images inverting them laterally; and a device carrying the sensitive surfaces and so constituted as to present these surfaces perpendicularly to the axes of the luminous rays emerging from the optical system.

2. In a stereoscopic photographic camera in which the images produced by the objectives are laterally inverted by reflecting-surfaces in order to avoid the cutting of the positives or negatives, the combination with the objectives, of reflecting-prisms arranged adjacent to the objectives, the edges of which prisms are perpendicular to the plane of the optical axes of the objectives and of which the faces of incidence and emergence are respectively perpendicular to the axes of the incident and emergent luminous rays and of which the emergent faces are directed oppositely in order to throw toward the center of the apparatus the two images inverting them laterally; and a device carrying the sensitive surfaces and so constituted as to present these surfaces perpendicularly to the axes of the luminous rays emerging from the optical system.

3. In a stereoscopic photographic camera, in which the images produced by the objectives are laterally inverted by reflecting-surfaces in order to avoid the cutting of the positives or negatives, the combination with the objectives, of the reflecting-prisms arranged behind the objectives, the edges of which prisms are perpendicular to the plane of the optical axes of the objectives and of which the faces of incidence and emergence are respectively perpendicular to the axes of the incident and emergent luminous rays and of which the emergent faces are directed oppositely in order to throw toward the center of the apparatus the two images inverting them laterally; and guide-rollers for guiding the sensitive surfaces so as to present their surfaces perpendicularly to the axes of the luminous rays emerging from the optical system.

4. In a stereoscopic photographic camera, in which the images produced by the objectives are laterally inverted by reflecting-surfaces in order to avoid the cutting of the positives or negatives, the combination with the objectives, of reflecting-prisms the edges of which prisms are perpendicular to the plane of the optical axes of the objectives and of which the faces of incidence and emergence are respectively perpendicular to the axes of the incident and emergent luminous rays and of which the emergent faces are directed oppositely in order to throw toward the center of the apparatus the two laterally-inverted images; and a film-band which is wound up and constituted so as to present two sensitive surfaces placed back to back in the center of the apparatus and perpendicular to the axes of the luminous rays emerging from each optical system.

5. A stereoscopic photographic camera, comprising a box, objectives or lenses held at opposite sides of the box, a reflecting-prism adjacent to each objective or lens, the emergent faces of the prisms being parallel and directed oppositely, and means for holding two sensitive surfaces within the box back to back and parallel to the emergent faces of the said prisms.

6. A stereoscopic photographic camera, comprising a box, objectives or lenses held at opposite sides of the box, a reflecting-prism adjacent to and behind each objective or lens, the emergent faces of said prisms being parallel and directed oppositely, a film-band and guide-rollers in the box for guiding the film-band parallel with the emergent faces of the said prisms.

7. A stereoscopic photographic camera, comprising a box provided with peep-holes in its back, objectives or lenses held at opposite sides of the box, a reflecting-prism adjacent to and behind each objective or lens, the emergent faces of the prisms being parallel and directed oppositely, a film-band spools in the box from and upon which the film-band is unwound and wound, and guide-rollers over which the film-band passes, two of the rollers being arranged near the back of the box and one near the front of the same.

The foregoing specification of my improvements in photostereoscopic apparatus by means of which the transposition of the negatives is obviated in printing positives signed by me this 24th day of December, 1902.

JULES SÉNÈQUE AUGUSTE TOURNIER.

Witnesses:
EDWARD P. MacLEAN,
MAURICE H. PIGNET.